(12) United States Patent
Kauffman

(10) Patent No.: US 12,132,788 B2
(45) Date of Patent: Oct. 29, 2024

(54) CLIENT COOKIE MANAGEMENT SYSTEM

(71) Applicant: Oracle International Corporation, Redwood Shores, CA (US)

(72) Inventor: Austin Nathaniel Kauffman, Warrenton, OR (US)

(73) Assignee: Oracle International Corporation, Redwood Shores, CA (US)

( * ) Notice: Subject to any disclaimer, the term of this patent is extended or adjusted under 35 U.S.C. 154(b) by 14 days.

(21) Appl. No.: 18/095,647

(22) Filed: Jan. 11, 2023

(65) Prior Publication Data

US 2024/0236195 A1 Jul. 11, 2024

(51) Int. Cl.
*H04L 67/146* (2022.01)

(52) U.S. Cl.
CPC .................................. *H04L 67/146* (2013.01)

(58) Field of Classification Search
CPC ...................................................... H04L 67/146
USPC ........................................................ 709/228
See application file for complete search history.

(56) References Cited

U.S. PATENT DOCUMENTS

| | | | | |
|---|---|---|---|---|
| 7,779,103 B1* | 8/2010 | Fikes | ................... | G06F 21/6263 709/227 |
| 7,921,152 B2 | 4/2011 | Ashley et al. | | |
| 8,738,782 B1* | 5/2014 | Lang | ................... | H04L 63/1466 709/228 |
| 9,578,111 B2 | 2/2017 | Kasivajjula et al. | | |
| 9,800,614 B2 | 10/2017 | Hinton et al. | | |
| 2006/0026286 A1 | 2/2006 | Lei et al. | | |
| 2013/0173815 A1 | 7/2013 | Canning et al. | | |
| 2019/0297147 A1* | 9/2019 | Drasin | ................... | H04L 67/141 |
| 2020/0007531 A1* | 1/2020 | Koottayi | ............... | H04L 67/146 |
| 2020/0128002 A1* | 4/2020 | Khanna | ................. | H04L 9/3228 |
| 2022/0198007 A1* | 6/2022 | Katta | .................... | H04L 63/101 |

OTHER PUBLICATIONS

"How SAP Mobile Platform Server Handles Cookies", SAP Administrator, Available Online at: https://help.sap.com/doc/329ac769552a411b97bc7adb991b6197/3.0.12/en-US/c817526fa45446cfbf59f8ef5df6d9e2.html, Accessed from Internet on Oct. 28, 2022, 2 pages.

(Continued)

*Primary Examiner* — Wing F Chan
*Assistant Examiner* — John Fan
(74) *Attorney, Agent, or Firm* — Kilpatrick Townsend & Stockton LLP

(57) ABSTRACT

A client cookie management system is disclosed that includes capabilities for securely managing a session between a web-based application and a user interacting with the web-based application using session cookies. The system receives a request from a user to access a resource provided by a web server and forwards the request to the web server. The web server generates a session cookie comprising a session identifier associated with a session created for the user. The system receives the session cookie from the web server and generates a new session cookie comprising a new session identifier and transmits the new session cookie to the client application. The system receives a second request to access a different resource from the client application. The second request comprises the new session cookie. Upon determining that the new session cookie is not modified, the system transmits the second request to the web server.

18 Claims, 9 Drawing Sheets

(56) References Cited

OTHER PUBLICATIONS

Long et al., "Designing Secure Session Based on Reverse Proxy", International Conference on Wavelet Active Media Technology and Information Processing (ICWAMTIP), Available Online at: https://ieeexplore.ieee.org/document/6413498, 2012, pp. 299-301.

Prapty et al., "Preventing Session Hijacking using Encrypted One-Time-Cookies", Wireless Telecommunications Symposium (WTS), Available Online at: https://hsnarman.github.io/CONF/20-WTS-PreventHijacking.pdf, 2020, 6 pages.

Pujolle et al., "Secure Session Management with Cookies", 7th International Conference on Information, Communications and Signal Processing, Available Online at: https://www.researchgate.net/publication/224107359_Secure_session_management_with_cookies, 2009, 6 pages.

Tank et al., "A Novel Approach to Prevent Session Hijacking Attack", International Journal of Computer Applications, vol. 181, No. 14, Available Online at: https://www.ijcaonline.org/archives/volume181/number14/tank-2018-ijca-917798.pdf, Sep. 2018, 3 pages.

* cited by examiner

| Original Session Cookie | New Session Cookie(s) |
|---|---|
| Session Cookie 1 (S1, User 1) | Session Cookie 2 (S2, User 1) |
| Session Cookie 1 (S1, User 1) | Session Cookie 3 (S3, User 1) |
| Session Cookie 1 (S1, User 1) | Session Cookie 4 (S4, User 1) |

FIG. 3

CLIENT COOKIE MANAGEMENT SYSTEM

BACKGROUND

With the explosion of the internet, ensuring the security to web applications and services used by enterprises is becoming increasingly important. Web application security involves the implementation of proper authentication and session management practices to evade threats and attacks that can compromise the confidentiality, integrity, and availability of web applications and services. Session management refers to the process of securely handling multiple requests to a web-based application or service from a single user or entity to maintain application state. In most cases, a session is initiated when a user supplies authentication such as a password. Based on the authentication, the user is then provided access to resources (e.g., a web application) stored on a web server.

Session management generally relies on the use of cookies for maintaining a user's session. After successful user authentication, session state information associated with the user's session is stored in the form of a cookie on the user's device. When the user (e.g., via a client application) connects to a web server to gain access to a resource, the cookie information is exchanged with the web server to verify the validity of the user's session. If the user's session is valid, the web server provides the user with access to the resource(s) using session information stored in the cookie without re-authenticating the user.

Existing techniques for performing session management suffer from certain drawbacks. For instance, the use of cookies in client applications (e.g., web browsers) can pose security or privacy concerns for an enterprise since the information stored by these cookies can be accessed by third party applications visited by the user. The improper use of cookies can also result in the access of sensitive information related to a user by an unauthorized user wanting to take control of the user's original and valid session. There is thus a need for developing improved techniques for making user session management more secure than what is possible by existing implementations.

BRIEF SUMMARY

The present disclosure relates generally to performing user session management between a web-based application and a user interacting with the web-based application using session cookies. More specifically, but not by way of limitation, this disclosure describes a client cookie management system that includes capabilities to detect modifications (if any) made to a session cookie responsive to a request received from a user to access a resource stored on a target system. In certain examples, based on the detected modifications, the disclosed client cookie management system can detect potential session hijacking attempts by an unauthorized user attempting to gain access to a user's original valid and active session.

In certain embodiments, a client cookie management system is disclosed. The system receives a first request from a client application. The first request is a request to access a first resource provided by a target system. The system transmits the first request to the target system and receives a session cookie from the target system. The session cookie comprises a session identifier associated with a session created by the target system. The system then generates a new session cookie comprising a new session identifier and selects a subset of one or more cookies to be transmitted to the client application. The subset of one or more cookies comprises the new session cookie. The system then transmits the subset of one or more cookies to the client application.

In certain embodiments, the system then receives a second request from the client application. The second request is a request for accessing a second resource provided by the target system and the second request includes the new session cookie. The system determines, based on the second request, that the new session cookie is not modified and responsive to determining that the new session cookie received from the client application is not modified, the system transmits the second request to the target system. In certain examples, the system determines that the new session cookie is not modified by comparing the new session cookie received as part of the second request from the client application to the new session cookie generated by the system.

In certain examples, the system determines, based on the second request, that the new session cookie is modified and responsive to determining that the new session cookie received from the client application is modified, the system denies access to the second resource provided by the target system.

In certain examples, the system receives one or more additional cookies associated with the user from the target system and the subset of cookies that is selected by the system to be transmitted to the client application comprises at least the new session cookie and one or more of the additional cookies.

In certain examples, the system stores the session cookie and the additional cookies in a local storage system associated with the system. The system additionally stores session information. The session information includes information identifying the session cookie received from the target system, the new session cookie generated by the system and a mapping between the session cookie and the new session cookie. In certain implementations, the session information is stored in a sessions table implemented in the system.

In certain examples, the first resource and the second resource may be a web application, a document, a file, a web page, web content, or a computing resource provided by the target system. In certain examples, the target system is a web server configured to service multiple requests from the client application, where the multiple requests include at least the first request and the second request received from the client application.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 illustrates an example of a sessions table implemented by the client cookie management system, according to certain embodiments.

DETAILED DESCRIPTION

Figure 1:
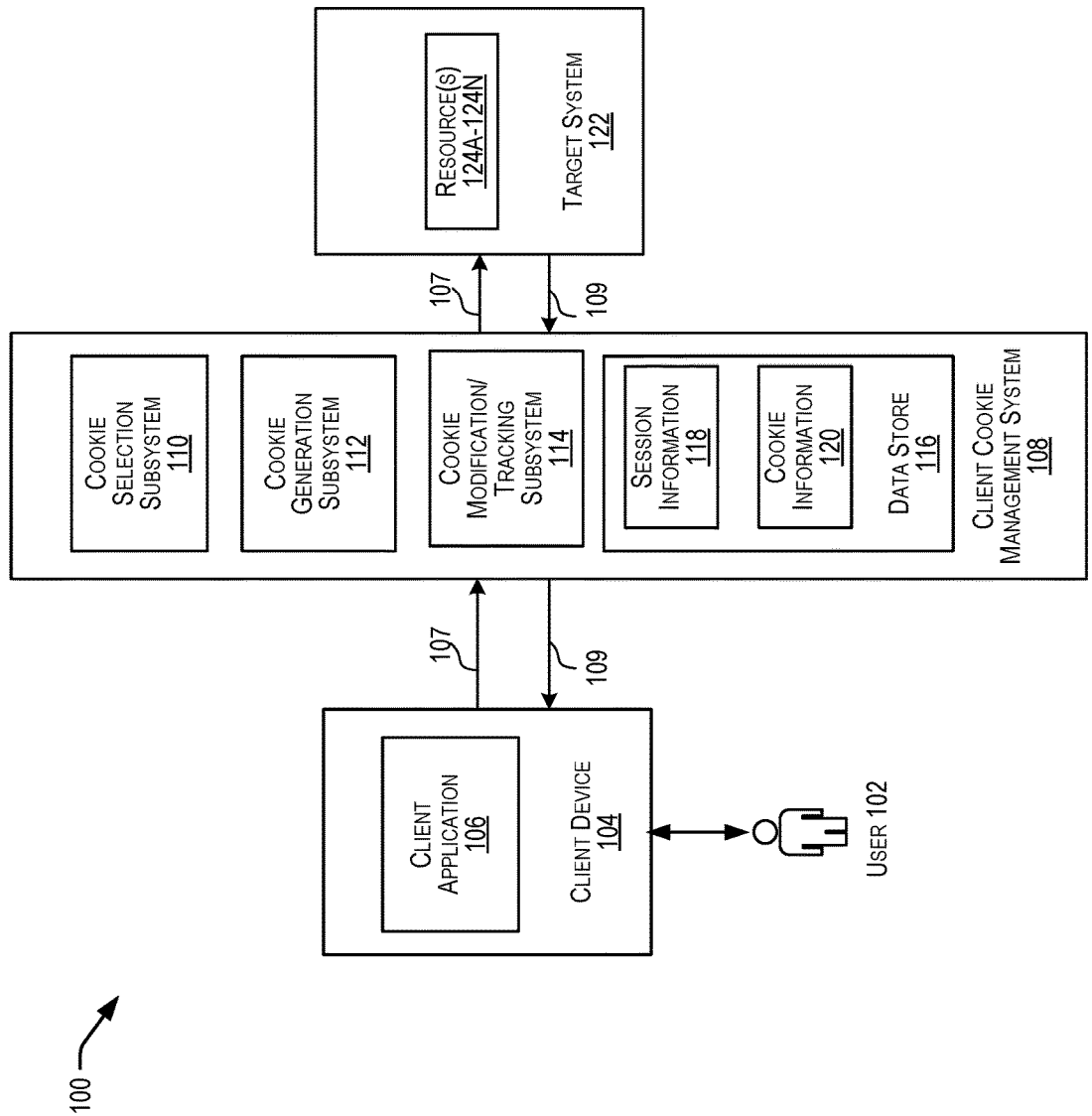
FIG. 1 depicts a simplified diagram of a computing environment that includes a client cookie management system that includes capabilities for securely managing a session between a web-based application and a user interacting with the web-based application using session cookies, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

As previously described, session management refers to the process of securely handling multiple requests to a web-based application or service from a single user or entity. In most cases, a session is initiated by a web server when a user opens a web browser and visits a website, or web application hosted by the web server. Upon successful connection, the server creates a session identifier or token which is a unique number used to identify the user that has persistence with a web application (or web site) hosted by the web server. The session identifier is stored inside the server and assigned to the specific user for the duration of that user's visit (session). In certain examples, the session ID may be stored in the form of a session cookie, form field, or URL. The session ID typically remains the same for some time and can be utilized across various pages of a website. When the user closes the browser and reopens the web browser to visit a site, a new session ID is created again.

In some instances, the use of session IDs to perform session management can compromise the confidentiality, integrity and availability of web applications, web sites and web services. For instance, after a user starts a session (for example by logging into a website hosted by a web server), an attacker could potentially hijack the user's session by obtaining a session cookie that stores a valid session ID stored on the browser and then hijack the user-validated session using the knowledge of the session ID. Once the attacker gains access to a user's session cookie, they can even impersonate the user and gain unauthorized access to the website or web application provided by the web server.

The present disclosure describes improved techniques for performing user session management than what is possible by conventional session management techniques. In certain embodiments, a client cookie management system is disclosed that includes capabilities for securely managing a session between a web-based application and a user interacting with the web-based application using session cookies. The client cookie management system receives a request from a user to access a resource stored on or provided by a web server and forwards the request to the web server. Upon successfully connecting, the web server creates a session identifier or token which is a unique number used to identify the user who has persistence with the web application (or web site) hosted by the web server and stores the session identifier in the form of a session cookie.

The client cookie management system receives the session cookie from the web server and, in certain embodiments, generates a new session cookie containing a new session identifier. The system then transmits the new session cookie (instead of an original session cookie generated by the target system) to the client application. The new session cookie is stored in the browser of the client application and is utilized by the browser to track the user's activities, such as when the user accesses a different page or a link in the resource (e.g., web page) accessed by the user.

When the user requests access to the same or a different resource (e.g., clicks on a different link on a web page), the client application transmits the new session cookie to the client cookie management system. The client cookie management system analyses the new session cookie and based on the analysis, determines if any modifications have been made to the new session cookie. If the client cookie management system determines that the new session cookie has been modified, it may take one or more actions such as such as terminate the user's session, notify an administrator of the client cookie management system that an unauthorized user is attempting to access the user's valid session or send a message to the user to re-authenticate with the target system.

By generating and transmitting a new session cookie (instead of the original session cookie) to the client application, the disclosed client cookie management system is able to prevent an attacker from gaining access to a user's original valid and active session since the attacker does not have access to the origin session cookie associated with the user's session. Additionally, by detecting modifications (if any) made to the new session cookie when a subsequent request is received from the client application, the client cookie management system is able to detect potential session hijacking attempts by an unauthorized user wanting to gain access to a user's original valid and active session. Thus, the client cookie management system is able to prevent the access of sensitive data related to the user and prevent an unauthorized user from being able to take control of a user's original and valid session.

Referring now to the drawings, FIG. 1 depicts a simplified diagram of a computing environment 100 that includes a client cookie management system that includes capabilities for securely managing a session between a web-based application and a user interacting with the web-based application using session cookies, according to certain embodiments. The client cookie management system 108 may be implemented by one or more computing systems that execute computer-readable instructions (e.g., code, program) to implement the client cookie management system 108. As depicted in FIG. 1, the client cookie management system 108 may include various subsystems such as a cookie selection subsystem 110, a cookie generation subsystem 112 and a cookie modification/tracking subsystem 114. Portions of data or information used by or generated by the client cookie management system 108 as part of its processing may be stored in a persistent memory such as a data store 116. As depicted in FIG. 1, the data store 116 may be configured to store session information 118 related to sessions created by the target system 122 for a user (e.g., 102) requesting access to resource(s) 124A-124N hosted by or provided by the target system. The data store 116 may additionally be configured to store information related to cookies (cookie information 120) associated with a user session established by the target system 122.

The resource(s) 124A-124N may include web applications, documents, files, web pages, web content, computing resources and so on that may be provided by or hosted by the target system 122. The target system 122 may represent a web server that is configured to service requests received from a client application for resources provided by the target system 122. The systems and subsystems depicted in FIG. 1 may be implemented using only software (e.g., code, instructions, program) executed by one or more processing units (e.g., processors, cores) of a computing system, hardware, or combinations thereof. The software may be stored on a non-transitory storage medium (e.g., on a memory device).

Computing environment 100 depicted in FIG. 1 is merely an example and is not intended to unduly limit the scope of claimed embodiments. One of ordinary skill in the art would recognize many possible variations, alternatives, and modifications. For example, in some implementations, the client cookie management system 108 can be implemented using more or fewer subsystems than those shown in FIG. 1, may combine two or more subsystems, or may have a different configuration or arrangement of subsystems. Additionally, while the computing environment 100 depicted in FIG. 1 illustrates the client cookie management system 108 receiving requests from a single user 102 requesting access to resources (e.g., 124A-124N) provided by the target system, in alternate embodiments, the client cookie management system 108 may be configured to receive requests from multiple different users via multiple different client devices for access to resources stored on or hosted by the target system 122.

The client cookie management system 108 may be implemented in various different configurations. In certain embodiments, the client cookie management system 108 may be implemented as a client cookie isolation proxy server within an enterprise (organization) servicing users of the enterprise. For instance, users of an enterprise may utilize the functionality of the client cookie isolation proxy server to securely manage a session between a web-based application and a user interacting with the web-based application using session cookies. In some other embodiments, the client cookie management system 108 may be implemented on one or more servers of a cloud service provider (CSP) and its secure session management functionality may be provided to subscribers (e.g., an organization or an enterprise) who subscribe to cloud services on a subscription basis.

As depicted in FIG. 1, a user 102 may request access to a resource (e.g., 124A), which may be a website or a web application, hosted by (or provided by) the target system 122 using a client application 106 executed by the user's client device 104. The client device 104 may be of various types, including but not limited to, a mobile phone, a tablet, a desktop computer, and the like. For instance, the user 102 may request access to a webpage or a web application provided by the target system 122 using a user interface (UI) (which may be a graphical user interface (GUI)) of the client application 106 by entering a uniform resource locator (URL) or other data identifying the requested resource. In certain embodiments, the client cookie management system 108 is configured to intercept the request 107 from the client application 106 and forward the request 107 to the target system 122. Upon successfully connecting, the target system 122 creates a session comprising a session identifier or token which is a unique number used to identify the user who has logged into the web application (or web site) hosted by the web server. The session identifier is stored by the target system 122 and assigned to the user (e.g., 102) for the duration of the user's visit (session). In certain examples, the target system 122 stores the session ID in the form of a session cookie.

The target system 122 then transmits the session cookie to the client cookie management system 108. The client cookie management system 108 utilizes the session cookie to securely manage the user's session established by the target system 122. In certain embodiments, and as will be described in greater detail below, the secure session management of the user's session involves generating, by the client cookie management system 108, a new session cookie associated with the user's session and transmitting the new session cookie (instead of the original session cookie generated by the target system) to the client application. The new session cookie is stored in the browser of the client application and is utilized by the browser to track the user's activities, such as when the user accesses the same or a different page or a link in the resource (e.g., web page) accessed by the user. For instance, when the user requests access to a different resource (e.g., clicks on a different link on a web page), the client application 106 transmits the new session cookie to the client cookie management system 108. The client cookie management system 108 analyses the new session cookie and based on the analysis, determines if any modifications have been made to the new session cookie. If the client cookie management system 108 determines that the new session cookie has been modified, the client cookie management system 108 may take one or more actions such as such as terminate the user's session, notify an administrator of the client cookie management system 108 that an unauthorized user is attempting to access the user's valid session or send a message to the user to re-authenticate with the target system.

By generating and transmitting a new session cookie (instead of the original session cookie) to the client application, the disclosed client cookie management system 108 is able to prevent an attacker from gaining access to a user's original valid and active session since the attacker does not have access to the origin session cookie associated with the user's session. Additionally, by detecting modifications (if any) made to the new session cookie when a subsequent request is received from the client application, the client cookie management system 108 is able to detect potential session hijacking attempts by an unauthorized user wanting to gain access to a user's original valid and active session. Thus, the client cookie management system is able to prevent the access of sensitive data related to the user and prevent an unauthorized user from being able to take control of a user's original and valid session.

In certain embodiments, the various subsystems (e.g., the cookie selection subsystem 110, the cookie generation subsystem 112 and the cookie modification/tracking system 114) within the client cookie isolation proxy 108 may be configured to perform the processing related to performing secure session management of a user's session. Details related to the processing performed by the various systems and subsystems in FIG. 1 are described below with respect to the flowchart depicted in FIG. 2 and its accompanying description.

Figure 2:
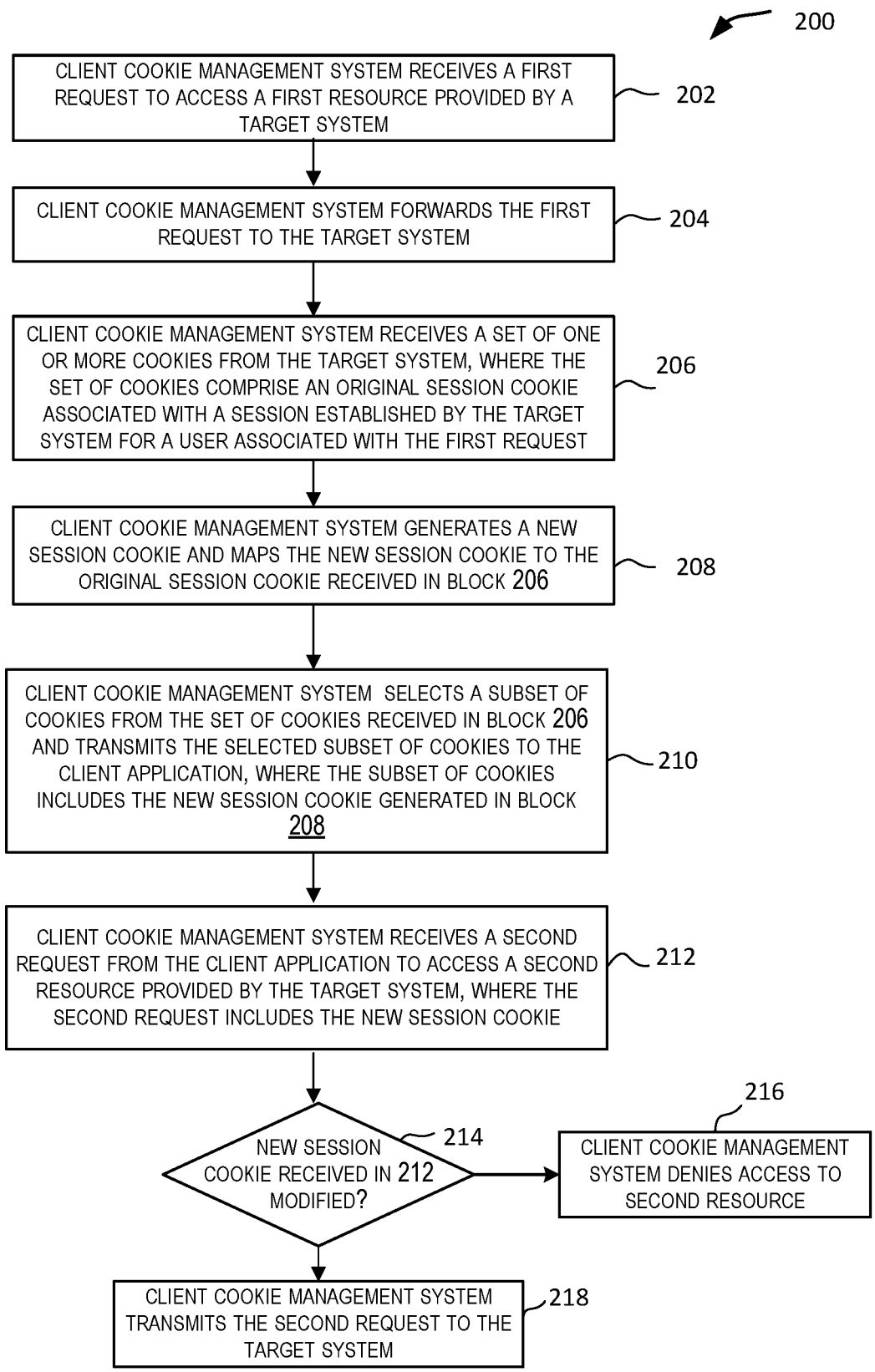
FIG. 2 depicts an example of a process performed by the client cookie management system within the computing environment depicted in FIG. 1, according to certain embodiments.

FIG. 2 depicts an example of a process 200 performed by the client cookie management system within the computing environment depicted in FIG. 1, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing depicted in FIG. 2 may be performed by one or more subsystems (e.g., 110, 112 and 114) of the client cookie management system 108.

At block 202, processing is initiated when the client cookie management system 108 receives a first request (e.g., 107) from a user (e.g., 102) to access a first resource 124A (e.g., a web page or a web application) stored on or provided by the target system 122. For instance, the user 102 may submit the first request 107 via a graphical user interface (GUI) of the client application 106 in the user's client device 104 by entering a uniform resource locator (URL) or other data identifying the requested first resource.

At block 204, the client cookie management system 108 transmits/forwards the request 107 to the target system 122. The target system 122 receives the request and creates a session ID (which is a unique combination of letters, numbers, and special characters) used to identify the user requesting access to the first resource. In certain implementations, as described above, the target system 122 creates and stores a session cookie identifying the session ID. As described above, the session cookie is active during the user's browsing session and used to track the user's movements within the website or web application accessed by the user.

In certain examples, in addition to generating a session cookie as described above, the target system 122 may be configured to generate one or more additional types of cookies associated with the user, such as, for instance, a permanent (persistent) cookie, an application cookie and so on. A "permanent (persistent) cookie" refers to a cookie that remains in operation even after the user closes the web browser. For instance, permanent cookies can store login details so that web users do not need to re-enter them every time they use a web site. An application cookie refers to a cookie that is installed directly by the website that the user is visiting. Application cookies enable website owners to collect user analytics data, remember user language settings and perform other useful functions that provide a good user experience.

At block 206, the client cookie management system 108 receives the set of one or more cookies (e.g., 109) from the target system 122. In certain examples, the set of one or more cookies include a session cookie (also referred to herein as an "original session cookie") associated with the session established by the target system for the user and one or more additional cookies (e.g., permanent cookies, application cookies and the like) generated by the target system. As part of the processing performed at block 206, the client cookie management system 108 identifies the set of cookies received from the target system 122 and stores the set of cookies locally in a local storage (e.g., as part of cookie information 120 in the data store 116). For example, in one instance, the client cookie management system 108 may identify that the set of cookies received from the target system include a session cookie (original session cookie), an application cookie, and a persistent cookie.

At block 208, the client cookie management system 108 generates a new session cookie comprising a new session identifier and maps the new session cookie to the original session cookie received from the target system. As will be described in greater detail below, the "new session cookie" enables the client cookie management system 108 to perform secure session management of the user's session by ensuring that the user's session is active and valid when a subsequent request is received from a user for one or more additional resources provided by the target system. In one implementation, the new session cookie is generated by the cookie generation subsystem 112 within the client cookie management system 108 and stored in a sessions table implemented by the client cookie management system 108. The sessions table may be stored as part of session information 118 in the data store 116.

FIG. 3 illustrates an example of a sessions table implemented by the client cookie management system 108, according to certain embodiments. The sessions table 300 stores information identifying one or more user sessions created by the target system 122 for a user (e.g., 102) requesting access to one or more resource(s) 124A-124N hosted by or provided by the target system. In the embodiment depicted in FIG. 3, the sessions table 300 stores information identifying a single user session. However, in alternate embodiments, the sessions table 300 may be configured to store information identifying multiple user sessions associated with a user. As depicted in FIG. 3, the information identifying the user session may comprise an original session cookie associated with the user's session that is used to identify the user who has logged into the web application (or web site) hosted by the target system. In certain examples, the original session cookie may be represented by a set of one or more session attributes and a set of attribute values associated with the set of session attributes.

By way of example, the set of session attributes associated with a session cookie may include a session identifier and a user identifier identifying the user requesting access to a resource provided by the target system. The session cookie may also include additional session attributes such as the creation date of the user's session, the expiration date of the user's session and the date when the user's session was last accessed. For instance, an original session cookie, "Session Cookie 1" received from the target system 122 may be represented as a set of session attributes (S1, User1) where S1 is the session identifier and User1 is the user identifier identifying the user requesting access to a resource provided by the target system.

In certain examples, the sessions table 300 additionally stores information identifying one or more new session cookies associated with the user's session. For instance, as described above, a new session cookie may be generated by the cookie generation subsystem 122 as a result of the processing performed in block 208 of FIG. 2. For example, a new session cookie (e.g., Session Cookie 2) may be represented as a set of session attributes (S2, User 1) where S2 represents a new session identifier, and User1 is the user identifier identifying the user requesting access to the resource provided by the target system. The new session cookie (Session Cookie 2) is stored in the sessions table 300. The sessions table 300 additionally maintains a mapping between the original session cookie and one or more new session cookies generated by the session cookie generation subsystem 112. As will be described in detail below, the cookie generation subsystem 112 may be configured with capabilities to generate a new session cookie responsive to each request received from the user for access to resources stored on the target system. For instance, in the example shown in FIG. 3, the sessions table 300 stores information identifying an original session cookie (Session Cookie 1), one or more new session cookies (Session Cookie 2, Session Cookie 3, Session Cookie 4, . . . , Session Cookie n) and additionally maintains a mapping between the original session cookie and each new session cookie generated by the session cookie generation subsystem 112.

Returning to the discussion of FIG. 2, at block 210, from the set of cookies identified in block 208, the client cookie management system 108 selects a subset of one or more cookies to be transmitted to the client application. In a certain implementation, the selection of the subset of cookies to be transmitted is performed by the cookie selection subsystem 110 in the client cookie management system 108. For instance, in one example, as part of the processing performed in block 210, the client cookie selection subsystem 110 may select to transmit only the new session cookie (generated in block 208) to the client application. In another example, the client cookie selection subsystem 110 may select to transmit the new session cookie and one or more other cookies (e.g., the application cookie and/or the persistent cookie) to the client application 106. As previously described, to securely manage the user's session established by the target system 122, instead of transmitting the original session cookie received from the target system 122 to the client application 106, at block 210, the client cookie management system 108 transmits the new session cookie to the client application 106.

The new session cookie may be stored in the browser of the client application 106 and utilized by the browser to track the user's activities (such as when the user accesses a different page or a link in a resource (e.g., a web page) accessed by the user. For example, at block 212, the client cookie management system 108 may receive a second (subsequent) request from the client application to access a second resource provided by the target system. The second resource may correspond to the same web page, a different web page, or a different link in a web page accessed by the user. The client cookie management system 108 also receives the new session cookie as part of the second request.

At block 214, the client cookie management system 108 determines if the new session cookie received from the client application as part of the second request has been modified. In a certain implementation, the client cookie modification/tracking subsystem 114 in the client cookie management system 108 may be configured to detect and track modifications (if any) that are made to the new session cookie received from the client application. To determine if the new session cookie has been modified, the client cookie management system 108 compares the new session cookie received as part of the second (subsequent) request in block 212 to the new session cookie generated in block 208 and stored as part of session information 118 in the data store 116. If the client cookie modification tracking subsystem 114 determines that the new session cookie received from the client application has been modified (i.e., that it does not correspond to the new session cookie stored in the sessions table), at block 216, the client cookie modification/tracking subsystem 114 denies the user access to the resource. Additionally, as part of the processing performed in block 216, the client cookie modification/tracking subsystem 114 may take one or more actions such as terminate the user's session, notify an administrator of the client cookie management system 108 that an unauthorized user is attempting to access the user's valid session or send a message to the user to re-authenticate with the target system.

By generating and transmitting a new session cookie (instead of the original session cookie) to the client application at block 208, the disclosed client cookie management system 108 is able to prevent an attacker from gaining access to a user's original valid and active session since the attacker does not have access to the origin session cookie associated with the user's session. Additionally, by detecting modifications (if any) made to the new session cookie when a subsequent request is received from the client application, the disclosed client cookie management system 108 is able to detect potential session hijacking attempts by an unauthorized user wanting to gain access to a user's original valid and active session, prevent the access of sensitive data related to the user and prevent an unauthorized user from being able to take control of a user's original and valid session.

At block 214, if the client cookie modification/tracking subsystem 114 determines that the new session cookie received as part of the subsequent request corresponds to the new session cookie generated in block 208, then, at block 218, the client cookie modification system 108 determines that the user's original session is still valid and transmits the subsequent request (with the exception of the new session cookie) and one or more additional cookies associated with the user's session to the target system 122. The target system 122 provides the user access to the resource identified in the second request by transmitting the original session cookie containing the original session ID back to the client cookie modification system 108.

The client cookie management system 108 receives the original session cookie and repeats the process described in block 208 to re-generate another new session cookie containing a new session identifier to be transmitted to the client application. The new session cookie is mapped to the original session cookie and stored in the sessions table. The newest session cookie is then transmitted to the client application. For instance, as a result of the operation performed in block 208, if the newest session cookie generated by the cookie generation subsystem 112 and stored in the sessions table 300 is Session Cookie 3(S3, User 1), the Session Cookie 3 is transmitted to the client application. By generating and transmitting a new session cookie (instead of the original session cookie) to the client application at block 208, the disclosed client cookie management system 108 is able to prevent an attacker from gaining access to a user's original valid and active session since the attacker does not have access to the origin session cookie associated with the user's session.

Figure 4:
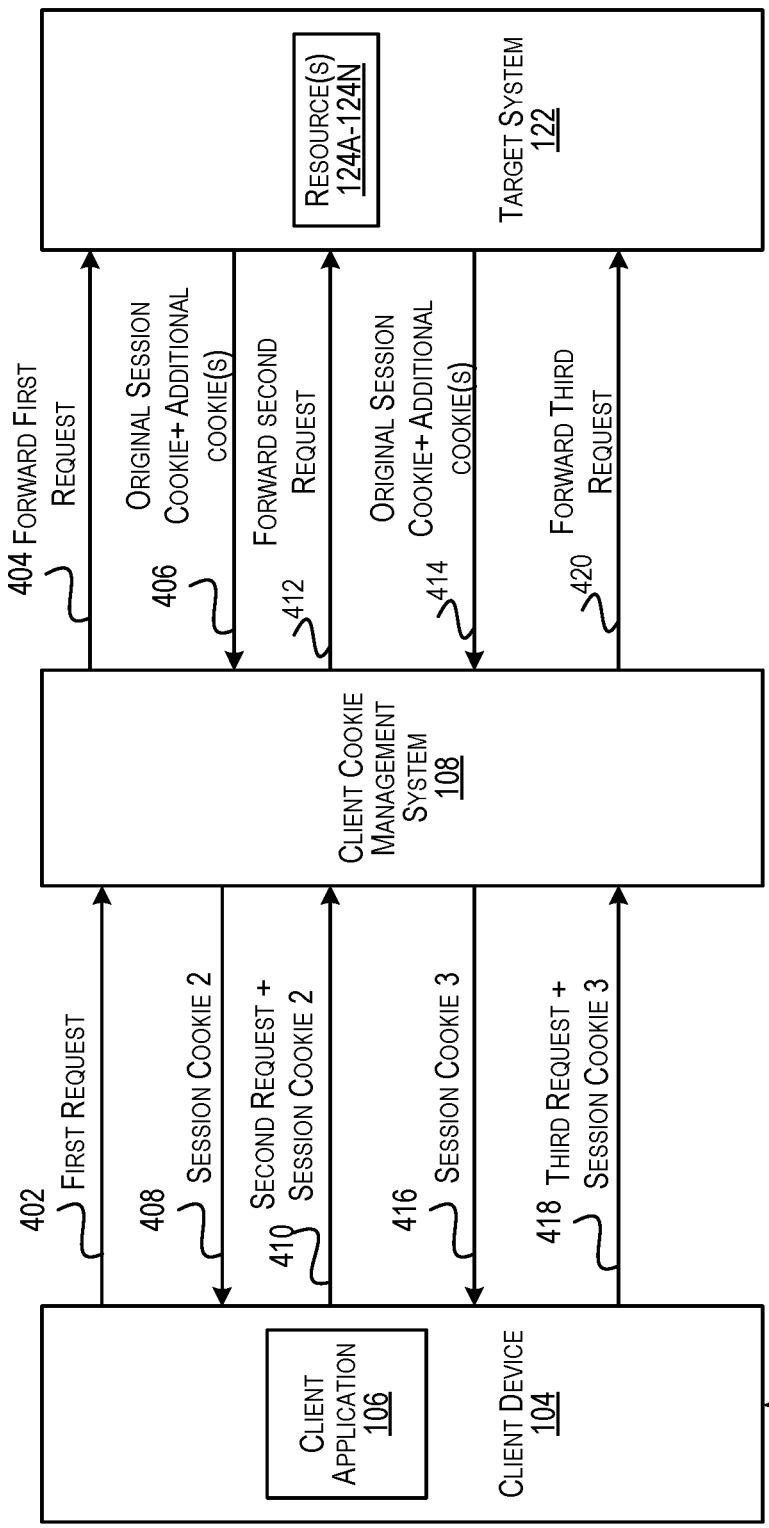
FIG. 4 is a sequence diagram illustrating the interactions between the various systems and subsystems shown in the computing environment 100 of FIG. 1 for securely managing a session between a web-based application and a user interacting with the web-based application using session cookies, according to certain embodiments.

FIG. 4 is a sequence diagram illustrating the interactions between the various systems and subsystems shown in the computing environment 100 of FIG. 1 for securely managing a session between a web-based application and a user interacting with the web-based application using session cookies, according to certain embodiments. The processing depicted in FIG. 4 is initiated at 402 when the client cookie management system 108 receives a first request from a user (e.g., 102) to access a first resource 124A (e.g., a web page or a web application) stored on or provided by the target system 122. For instance, the user 102 may submit the first request via a graphical user interface (GUI)) of the client application 106 by entering a uniform resource locator (URL) or other data identifying the requested first resource.

At operation 404, the client cookie management system 108 transmits/forwards the request (e.g., 107 shown in FIG. 1) to the target system 122. The target system 122 receives the request and creates a session ID (which is a unique combination of letters and numbers) used to identify the user requesting access to the first resource. In certain implementations, as described above, the target system 122 creates and stores a session cookie identifying the session ID.

At operation 406, the client cookie management system 108 receives a set of one or more cookies from the target system 122. As described above, the set of one or more cookies include a session cookie (also referred to herein as an "original session cookie") associated with the session established by the target system for the user and one or more additional cookies (e.g., permanent cookies, application cookies and the like) generated by the target system 122.

At operation 408, the client cookie management system 108 transmits a new session cookie (session cookie 2) along with one or more additional cookies to the client application. As previously described, upon receiving the original session cookie from the target system, the client cookie management system 108 generates a new session cookie (e.g., session cookie 2) comprising a new session identifier and maps the new session cookie to the original session cookie received from the target system. The new session cookie along with one or more additional cookies (if any) is then transmitted to the client application.

At operation 410, the client cookie management system 108 receives a second request (i.e., subsequent request) from the client application 106 from a user to access a second resource provided by the target system. The second resource may correspond to the same or a different web page/web application or a different link in a web page accessed by the user. The client cookie management system 108 also receives the new session cookie (e.g., session cookie 2) as part of the second request.

Upon receiving the second request comprising the new session cookie, the client cookie management system 108 determines if the new session cookie has been modified. As previously described, to determine if the new session cookie has been modified, the client cookie management system 108 compares the new session cookie received in operation 410 to the new session cookie generated by the client cookie modification system and stored as part of session information 118 in the data store 116.

If the client cookie management system 108 determines that the new session cookie has not been modified, then in operation 412, the system 108 transmits the subsequent request (with the exception of the new session cookie) and one or more additional cookies (if any) associated with the user's session to the target system 122. The target system 122 provides the user access to the resource identified in the second request by transmitting the original session cookie containing the original session ID and one or more additional cookies (if any) associated with the user's session to the client cookie management system 108. If the new session cookie has been modified, the client cookie management system 108 may take one or more actions such as such as terminate the user's session, notify an administrator of the client cookie management system 108 that an unauthorized user is attempting to access the user's valid session or send a message to the user to re-authenticate with the target system.

At operation 414, the client cookie management system 108 receives the original session cookie and the additional cookies from the target system and generates another new session cookie (session cookie 3) containing a new session identifier to be transmitted to the client application. The new session cookie is mapped to the original session cookie and stored in the sessions table.

At operation 416, the client cookie management system 108 transmits the new session cookie to the client application. The new session cookie may be stored in the browser of the client application 106 and utilized by the browser to track the user's activities (such as when the user accesses the same or a different page or a link in a resource (e.g., a web page) accessed by the user. For example, at operation 418, the client cookie management system 108 may receive a third request from the client application to access a different resource provided by the target system. The resource may correspond to a different web page/web application or a different link in a web page accessed by the user. The client cookie management system 108 also receives the new session cookie as part of the third request. At operation 420, after determining that the new session cookie has not been modified, the client cookie management system forwards/transmits the third request to the target system.

The client cookie management system disclosed herein includes capabilities for securely managing a session between a web-based application and a user interacting with the web-based application using session cookies. By generating and transmitting a new session cookie (instead of the original session cookie) to the client application, the client cookie management system is able to prevent an attacker from gaining access to a user's original valid and active session since the attacker does not have access to the origin session cookie associated with the user's session. Additionally, by detecting modifications (if any) made to the new session cookie when a subsequent request is received from the client application, the client cookie management system is able to detect potential session hijacking attempts by an unauthorized user wanting to gain access to a user's original valid and active session.

In certain embodiments, the functionality of the client cookie management system may be provided as a service by an Infrastructure-as-a-Service (IaaS) provider. The following section describes an example IaaS infrastructure that may be used to implement the service.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
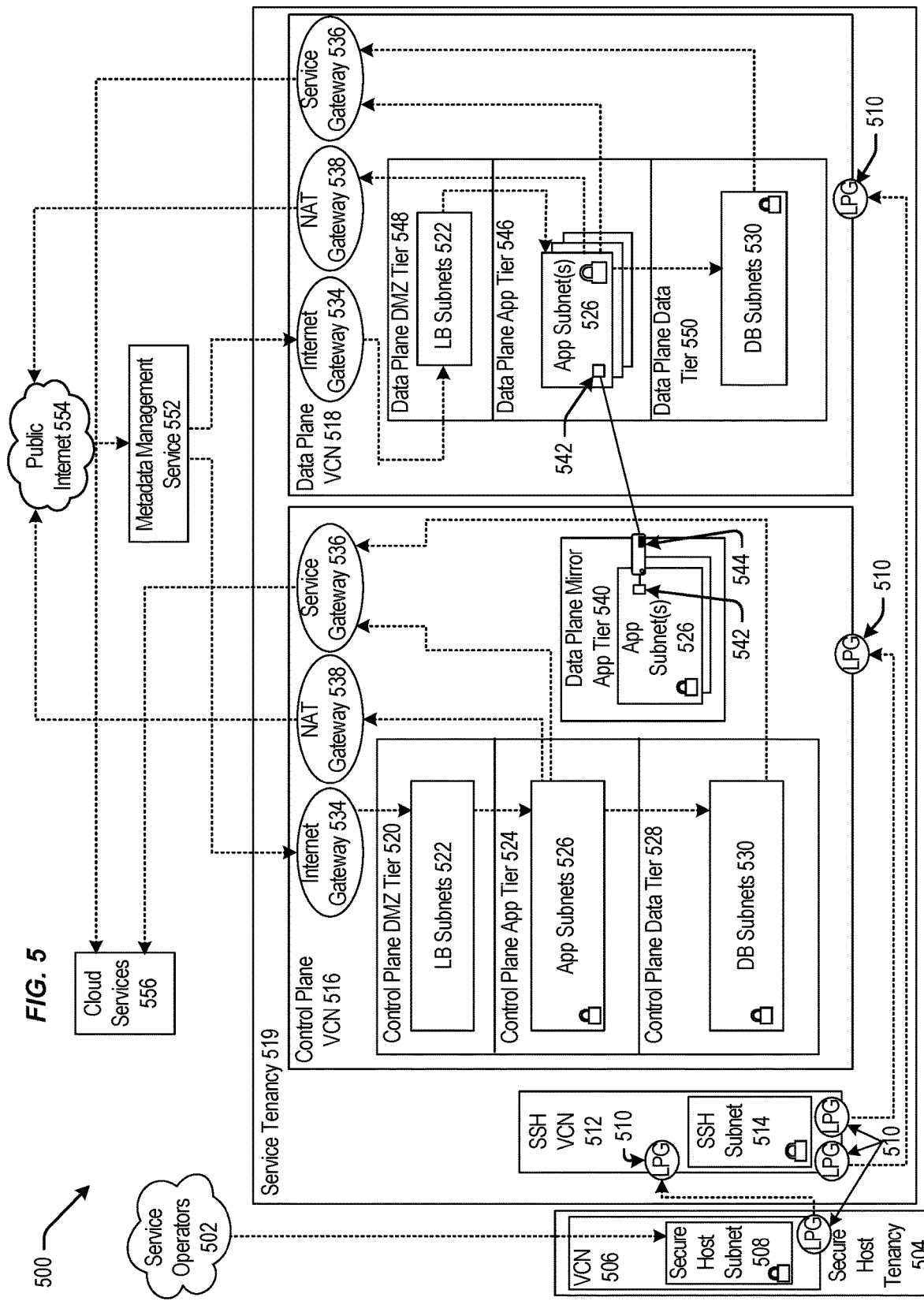
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry®, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Metadata that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
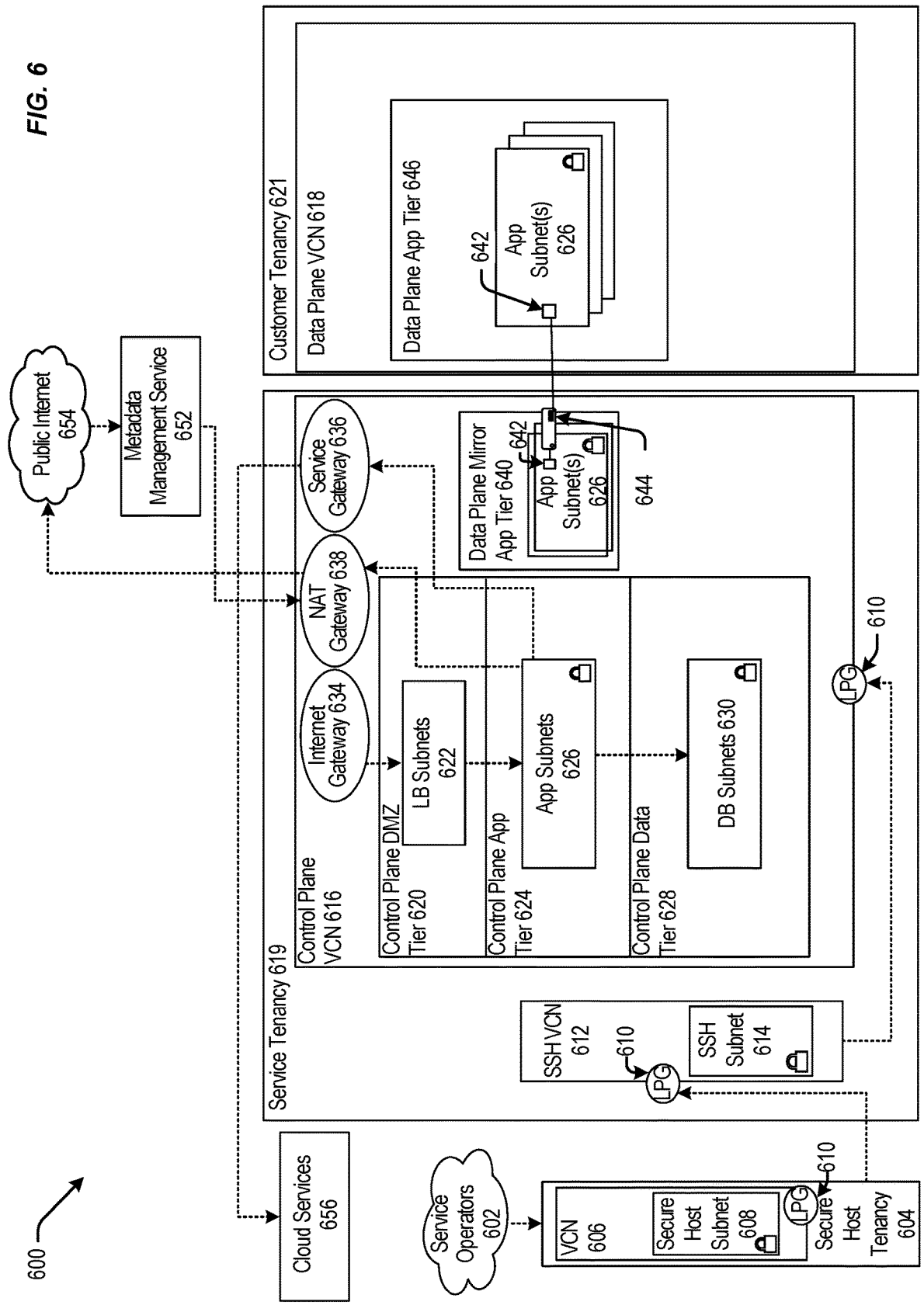
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 606 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 510 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 552 of FIG. 5) that can be communicatively coupled to public Internet 654 (e.g., public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
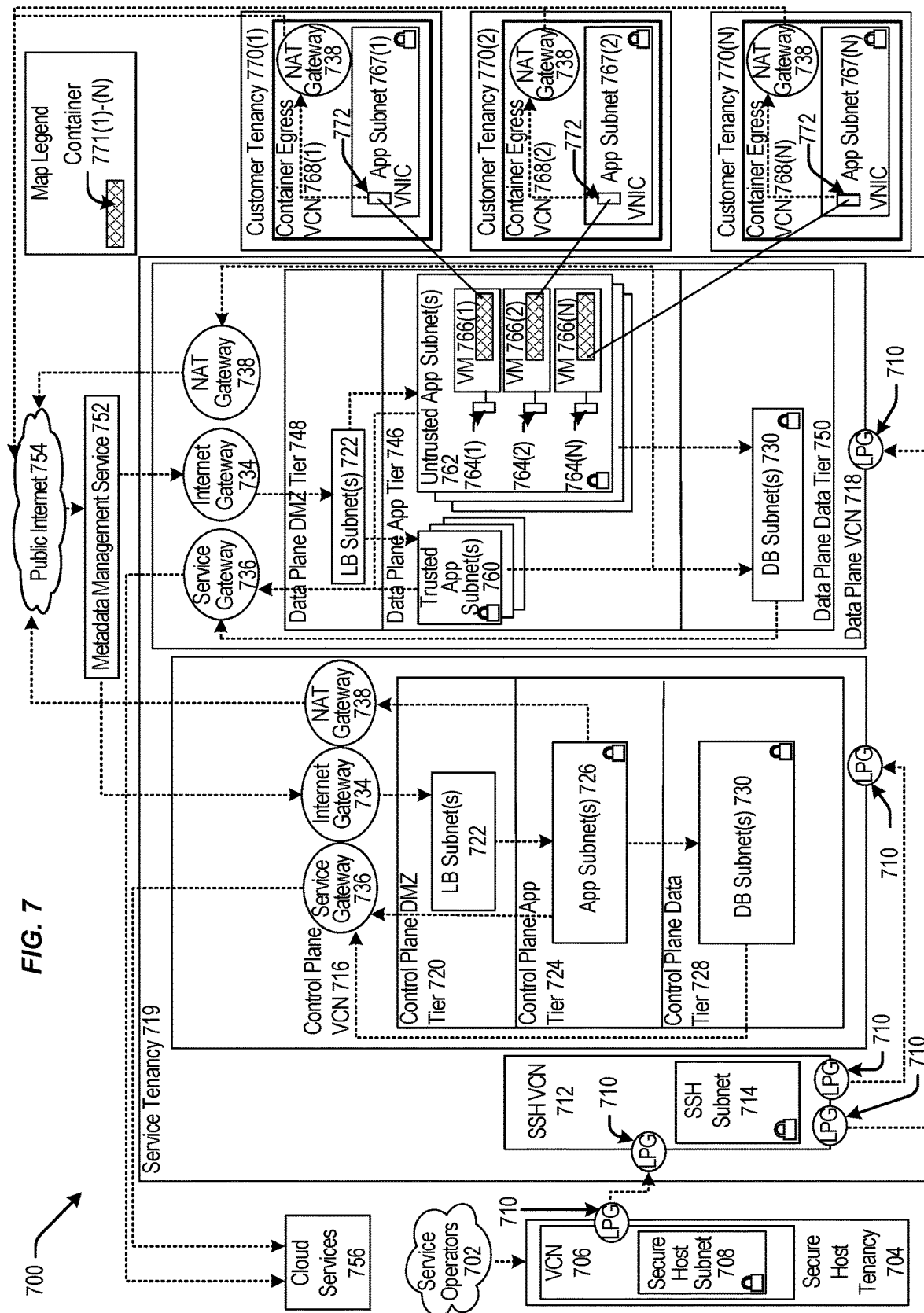
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 506 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5) via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5).

The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
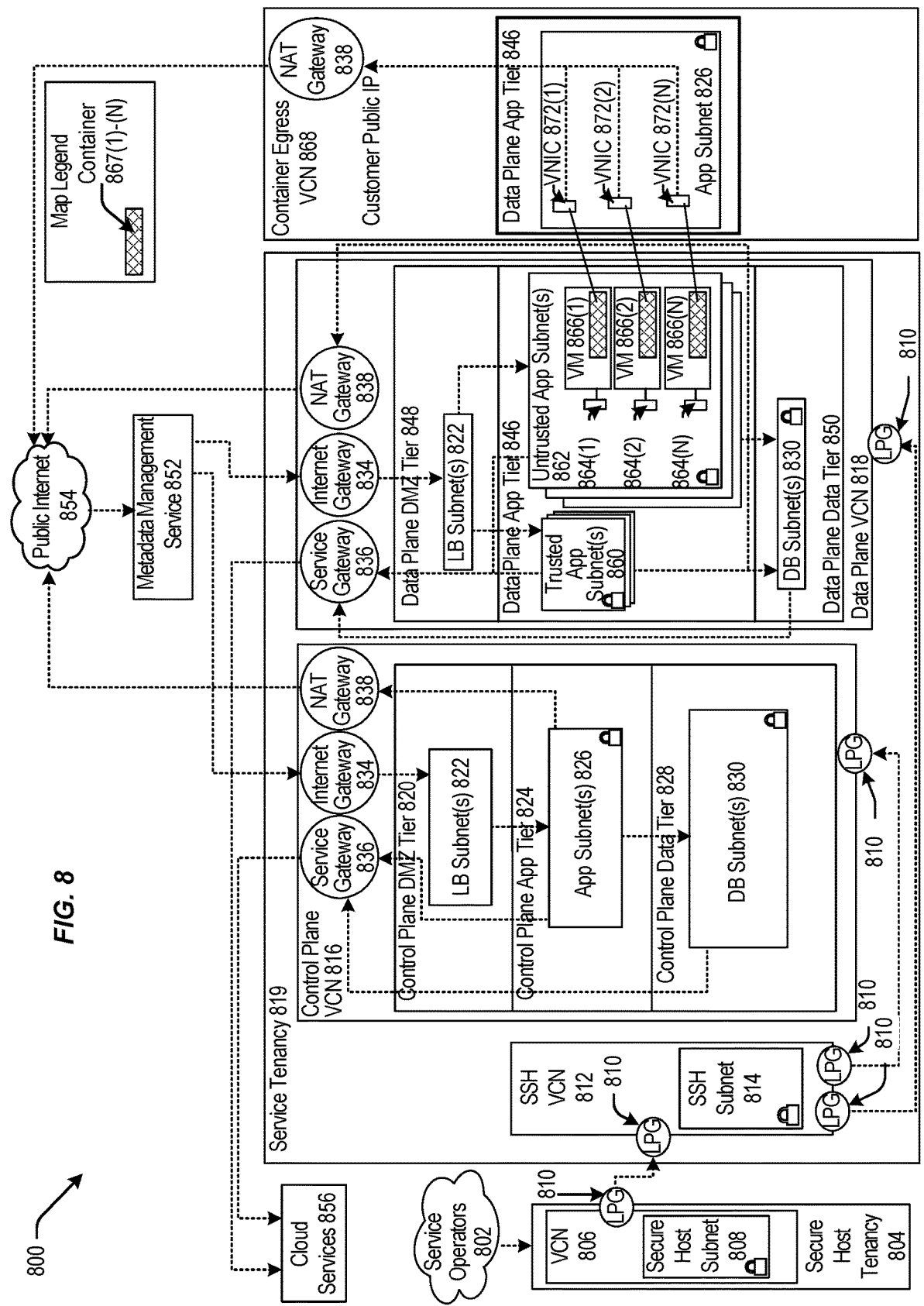
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5) via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
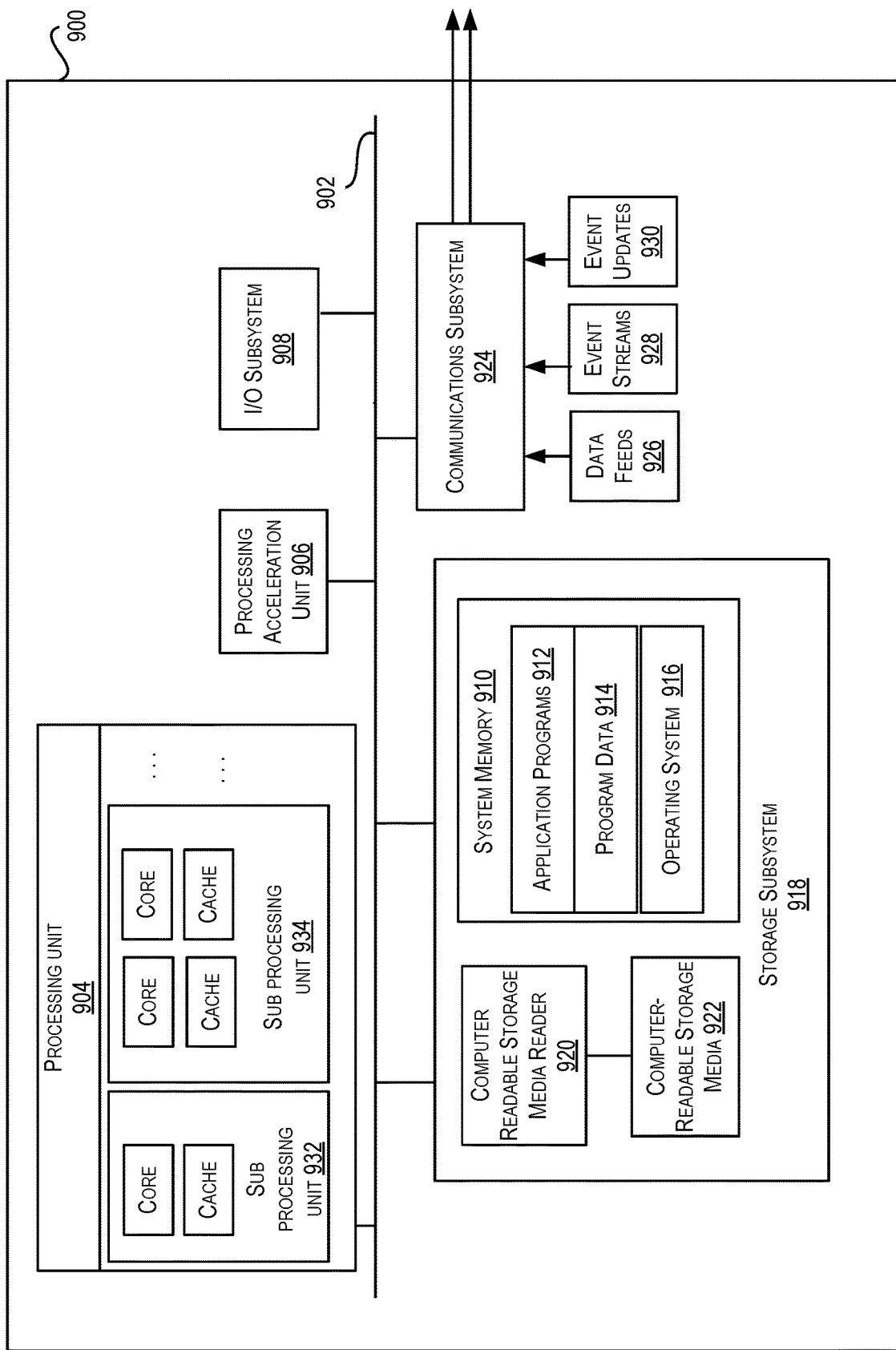
FIG. 9 is a block diagram illustrating an example computer system, according to at least one embodiment.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope 10 of the specification. The specification and drawings are, accordingly, to be regarded as illustrative rather than restrictive.

What is claimed is:

1. A computer-implemented method comprising:
receiving, by a computer system, a first request from a client application, the first request for accessing a first resource provided by a target system;
transmitting, by the computer system, the first request to the target system;
responsive to the first request, receiving, by the computer system, an original session cookie from the target system, the original session cookie comprising an original session identifier associated with a user session created by the target system;
generating, by the computer system, a new session cookie comprising a new session identifier associated with the user session;
mapping, by the computer system, the new session cookie associated with the user session to the original session cookie associated with the user session;
storing, by the computer system, the original session cookie, the new session cookie and the mapping of the new session cookie to the original session cookie in a local storage system associated with the computer system;
selecting, by the computer system, a subset of one or more cookies to be transmitted to the client application, the selected subset of one or more cookies comprising at least the new session cookie;
transmitting, by the computer system, the selected subset of one or more cookies to the client application;
receiving, by the computer system, a second request from the client application, the second request for accessing a second resource provided by the target system, the second request comprising the new session cookie;
determining, by the computer system, based at least in part on the second request that the new session cookie is not modified; and
responsive to determining that the new session cookie received from the client application is not modified, transmitting, by the computer system, the second request to the target system.

2. The computer-implemented method of claim 1, further comprising:
  determining, by the computer system, based at least in part on the second request that the new session cookie is modified; and
  responsive to determining that the new session cookie received from the client application is modified, denying, by the computer system, access to the second resource provided by the target system.

3. The computer-implemented method of claim 1, wherein determining that the new session cookie is not modified comprises:
  comparing, by the computer system, the new session cookie received as part of the second request from the client application to the new session cookie generated by the computer system.

4. The computer-implemented method of claim 1, further comprising:
  receiving, from the target system, one or more additional cookies associated with the user; and wherein:
  the selected subset of one or more cookies comprises at least the new session cookie and the one or more additional cookies to be transmitted to the client application.

5. The computer-implemented method of claim 4, further comprising:
  storing, by the computer system, the one or more additional cookies in the local storage system.

6. The computer-implemented method of claim 1, wherein the original session cookie, the new session cookie and the mapping of the new session cookie to the original session cookie is stored in a sessions table in the local storage system.

7. The computer-implemented method of claim 1, wherein the first resource and the second resource comprise at least one of a web application, a document, a file, a web page, web content, or a computing resource provided by the target system.

8. The computer-implemented method of claim 1, wherein the target system is a web server configured to service a plurality of requests from the client application, and wherein the plurality of requests includes at least the first request and the second request.

9. A client cookie management system comprising:
  a memory; and
  one or more processors configured to perform processing, the processing comprising:
    receiving a first request from a client application, the first request for accessing a first resource provided by a target system;
    transmitting the first request to the target system;
    responsive to the first request, receiving an original session cookie from the target system, the original session cookie comprising an original session identifier associated with a user session created by the target system;
    generating a new session cookie comprising a new session identifier associated with the user session;
    mapping the new session cookie associated with the user session to the original session cookie associated with the user session;
    storing the original session cookie, the new session cookie and the mapping of the new session cookie to the original session cookie in a local storage system associated with the client cookie management system;
    selecting a subset of one or more cookies to be transmitted to the client application, the selected subset of one or more cookies comprising at least the new session cookie;
    transmitting the selected subset of one or more cookies to the client application;
    receiving a second request from the client application, the second request for accessing a second resource provided by the target system, the second request comprising the new session cookie;
    determining, based at least in part on the second request, that the new session cookie is not modified; and
    responsive to determining that the new session cookie received from the client application is not modified, transmitting the second request to the target system.

10. The system of claim 9, further comprising:
  determining, based at least in part on the second request, that the new session cookie is modified; and
  responsive to determining that the new session cookie received from the client application is modified, denying access to the second resource provided by the target system.

11. The system of claim 9, wherein determining that the new session cookie is not modified comprises comparing the new session cookie received as part of the second request from the client application to the new session cookie stored in the local storage system.

12. The system of claim 9, further comprising:
  receiving, from the target system, one or more additional cookies associated with the user; and wherein:
  the selected subset of one or more cookies comprises at least the new session cookie and the one or more additional cookies to be transmitted to the client application.

13. The system of claim 12, further comprising:
  storing the one or more additional cookies in the local storage system.

14. The system of claim 9, wherein the original session cookie, the new session cookie and the mapping of the new session cookie to the original session cookie is stored in a sessions table in the local storage system.

15. A non-transitory computer-readable medium storing instructions executable by a computer system that, when executed by one or more processors of the computer system, cause the one or more processors to perform operations comprising:
  receiving a first request from a client application, the first request for accessing a first resource provided by a target system;
  transmitting the first request to the target system;
  responsive to the first request, receiving an original session cookie from the target system, the original session cookie comprising an original session identifier associated with a user session created by the target system;
  generating a new session cookie comprising a new session identifier associated with the user session;
  mapping the new session cookie associated with the user session to the original session cookie associated with the user session;
  storing the original session cookie, the new session cookie and the mapping of the new session cookie to the original session cookie in a local storage system associated with the computer system;

selecting a subset of one or more cookies to be transmitted to the client application, the selected subset of one or more cookies comprising at least the new session cookie;

transmitting the selected subset of one or more cookies to the client application;

receiving a second request from the client application, the second request for accessing a second resource provided by the target system, the second request comprising the new session cookie;

determining, based at least in part on the second request, that the new session cookie is not modified; and responsive to determining that the new session cookie received from the client application is not modified, transmitting the second request to the target system.

16. The non-transitory computer-readable medium of claim 15, further comprising:

determining, based at least in part on the second request, that the new session cookie is modified; and responsive to determining that the new session cookie received from the client application is modified, denying access to the second resource provided by the target system.

17. The non-transitory computer-readable medium of claim 15, wherein determining that the new session cookie is not modified comprises comparing the new session cookie received as part of the second request from the client application to the new session cookie stored in the local storage system.

18. The non-transitory computer-readable medium of claim 15, wherein the target system is a web server configured to service a plurality of requests from the client application, and wherein the plurality of requests includes at least the first request and the second request.

* * * * *

UNITED STATES PATENT AND TRADEMARK OFFICE
CERTIFICATE OF CORRECTION

PATENT NO. : 12,132,788 B2
APPLICATION NO. : 18/095647
DATED : October 29, 2024
INVENTOR(S) : Kauffman Page 1 of 1

It is certified that error appears in the above-identified patent and that said Letters Patent is hereby corrected as shown below:

In the Specification

In Column 9, Line 20, delete ". . . ," and insert -- . . . . , --, therefor.

In Column 28, Line 25, delete "scope 10" and insert -- scope --, therefor.

Signed and Sealed this
Fourth Day of February, 2025

Coke Morgan Stewart
*Acting Director of the United States Patent and Trademark Office*